May 6, 1941.  E. ROIRANT  2,241,161

GLASS FURNACE PROVIDED WITH DRAWING-OFF BASINS

Filed Jan. 6, 1937  2 Sheets-Sheet 1

E. Roirant
Inventor
By Glascock Downing & Seebold
Attys.

May 6, 1941.  E. ROIRANT  2,241,161
GLASS FURNACE PROVIDED WITH DRAWING-OFF BASINS
Filed Jan. 6, 1937   2 Sheets-Sheet 2
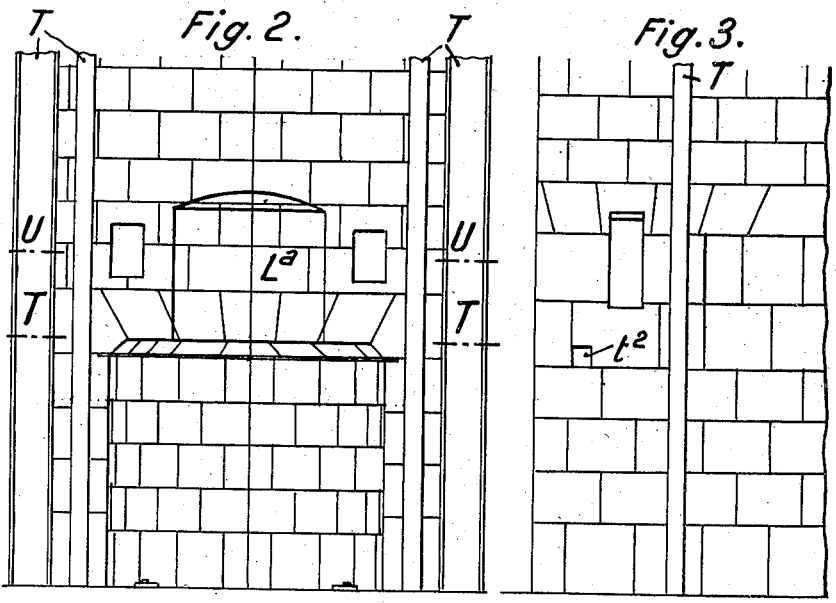
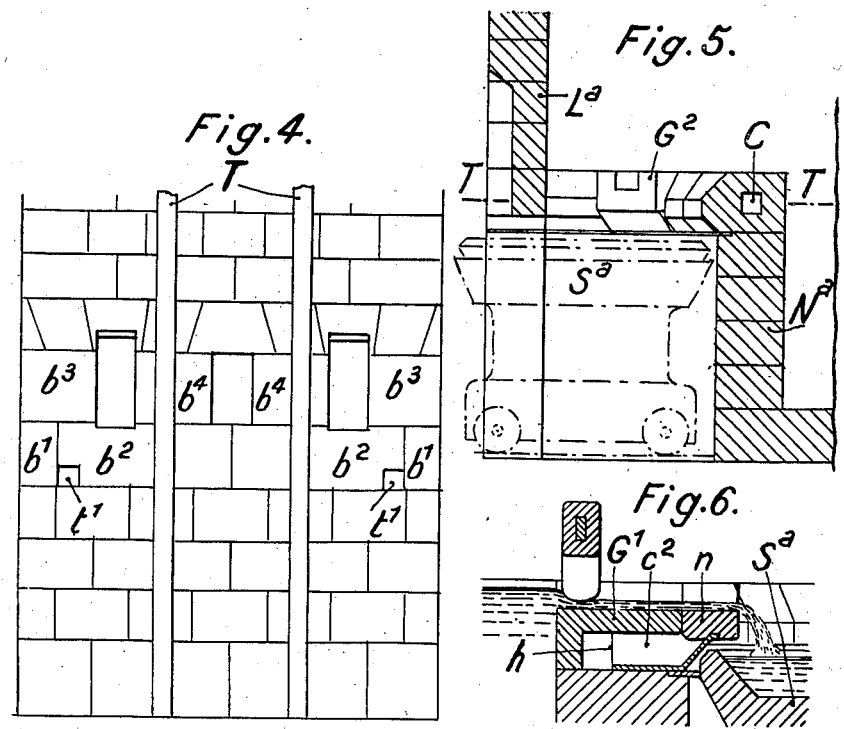

Patented May 6, 1941

2,241,161

UNITED STATES PATENT OFFICE 2,241,161

GLASS FURNACE PROVIDED WITH DRAWING-OFF BASINS

Emile Roirant, Paris, France, assignor to Société Continentale d'Appareils Mecaniques pour la Verrerie, Basel, Switzerland Application January 6, 1937, Serial No. 119,316
In France December 17, 1936

5 Claims. (Cl. 49—56)

It is known that some glass furnaces—adapted to cooperate with automatic machines drawing off glass by suction—are provided with accessory chambers, which are constantly supplied with molten glass by the main furnace and in which the glass is usually gathered by dipping parison moulds in the molten glass.

It is also known that, when these gathering chambers are basins of relatively small dimensions, usually receiving a movement of rotation, intermittent or not, it is advantageous to arrange these basins within the furnace itself by providing in the latter recesses formed in the facing of the furnace wall and resembling certain niches known in architecture. The gathering basins are thus, so to speak, integrated in the furnace, so that the free surface of the molten glass is constantly washed by the high temperature gases contained in the furnace and receives from these latter a constant supply of heat.

Owing to these arrangements, the glass contained in the basin is constantly in thermal conditions nearly identical to those of the molten glass in the furnace, which circumstance is very favourable for preserving the qualities of the glass drawn off.

In practice, the gathering chambers receive, by gravity, molten glass from the main furnace, this glass discharging in the chambers through channels, most often adjustable by means of sluice-gates and usually in the form of troughs made of refractory material.

These installations, the operation of which is very satisfactory concerning their cooperation with the transforming machines which draw off molten glass therefrom, however develop, in the course of time, various problems, relating to the maintenance and regeneration with which the present invention is concerned.

Their various elements, and particularly the niches and troughs supplying glass to the gathering chambers, are in fact subjected to an intense degradation, since they are exposed, without interruption, to a very high temperature the progressive destructive action of which is further increased by the chemical corrosion caused by the constituents of the glass. In particular, the discharging troughs, permanently exposed to the friction of the glass flowing therein, are subjected to a progressive wear tending to render them useless after a period of time appreciably shorter than the normal life of a furnace, or even than the duration of a period of operation of the latter, this term meaning the period of time after which it becomes necessary, in an ordinary furnace, to remove the upper bricks of the furnace, that is to say to replace the upper brickwork of the same.

It is also to be pointed out that the wear of the troughs—resulting from the destructive effects to which they are unceasingly subjected on the part of physical and chemical agents, in particular of the friction unsatisfactorily supported by the friable material constituting them—entails two consequences: on the one hand, the impossibility of controlling by means of obturators the discharge of the glass in the channel more or less irregularly deepened by wear and, on the other hand, as soon as this wear is very accentuated towards the front and so-called "nose" portion of the trough, the drop of the glass, at least partially, outside the gathering basins, rendering working impossible.

On the other hand, the niches can, in the course of time, be the seat of infiltrations of the glass through interstices which the high temperature tends to form between the constituent bricks: the presence of butt strap devices is only a temporary remedy for these infiltrations. The life of the furnace also depends upon the resistance of the bricks.

Since considerable economic losses are caused, in glass-works, by the momentary stoppage of a furnace, and considering these undesirable consequences become extremely serious if the furnace is completely emptied, these two contingencies, particularly the second one, must be contemplated only in the last resort and must be deferred as long as possible. Therefore, operations of this importance should not be contemplated, for the simple replacement of a worn trough or for the maintenance of a small element of the brickwork.

On the other hand, this replacement is rendered extremely difficult, if not impossible, by the fact that these troughs are inaccessible, as they are located within the furnace, in an atmosphere at a very high temperature, and the displacement and removal of said troughs can be attempted, from the exterior, only through narrow openings, and with danger for the operators, with, in addition, an extremely problematic success.

In the construction of furnaces provided with niches of the recess type herein referred to, an apparently simple solution which would consist, in order to allow replacement, or maintenance of the troughs, in temporarily loosening some bricks of the brickwork for affording access towards the interior of the furnace, opposite the troughs, cannot be carried out in reality, as it would be liable, on the one hand, to cause the glass to flow from the interior of the furnace towards the exterior through the openings thus provided.

The lowering of the level of the glass in the furnace, for avoiding this inconvenience, would give rise to another and still more serious inconvenience, owing to the loss of material resulting therefrom and to the momentary stoppage of the furnace it necessitates. On the other hand, the formation of these temporary openings is generally excluded by the mode of construction of the niches themselves, as the edges of the niche are rigid, by construction, with the straight facings of the main brickwork of the furnace, so that any tampering with said brickwork seriously endangers the strength of the niches themselves and, particularly, of the lintel portion overhanging the opening of these niches.

In view of these difficulties and of these practical impossibilities, the invention has for its object to increase the life of the gathering installation to the extent that it reaches the duration of a normal operation whereupon the furnace is temporarily stopped, not prematurely, but at the time a general repairing is desirable in the normal order of operation of this furnace.

A glass furnace, with gathering chambers of the type above mentioned, made in accordance with the invention, is illustrated in the accompanying drawings.

In the drawings:

Fig. 2 is a view of an angle of the furnace, constituting a gathering station, seen in the direction of the arrow B of Fig. 1.

Fig. 3 is a view of a front wall of the furnace, seen in the direction of the arrow D of Fig. 1.

Fig. 4 is a view of a front wall of the furnace, seen in the direction of the arrow E of Fig. 1.

Fig. 5 shows a niche in vertical section taken on line X—Y of Fig. 1.

Fig. 6 is a partial vertical sectional view made through the axis of a trough.

Figure 1:
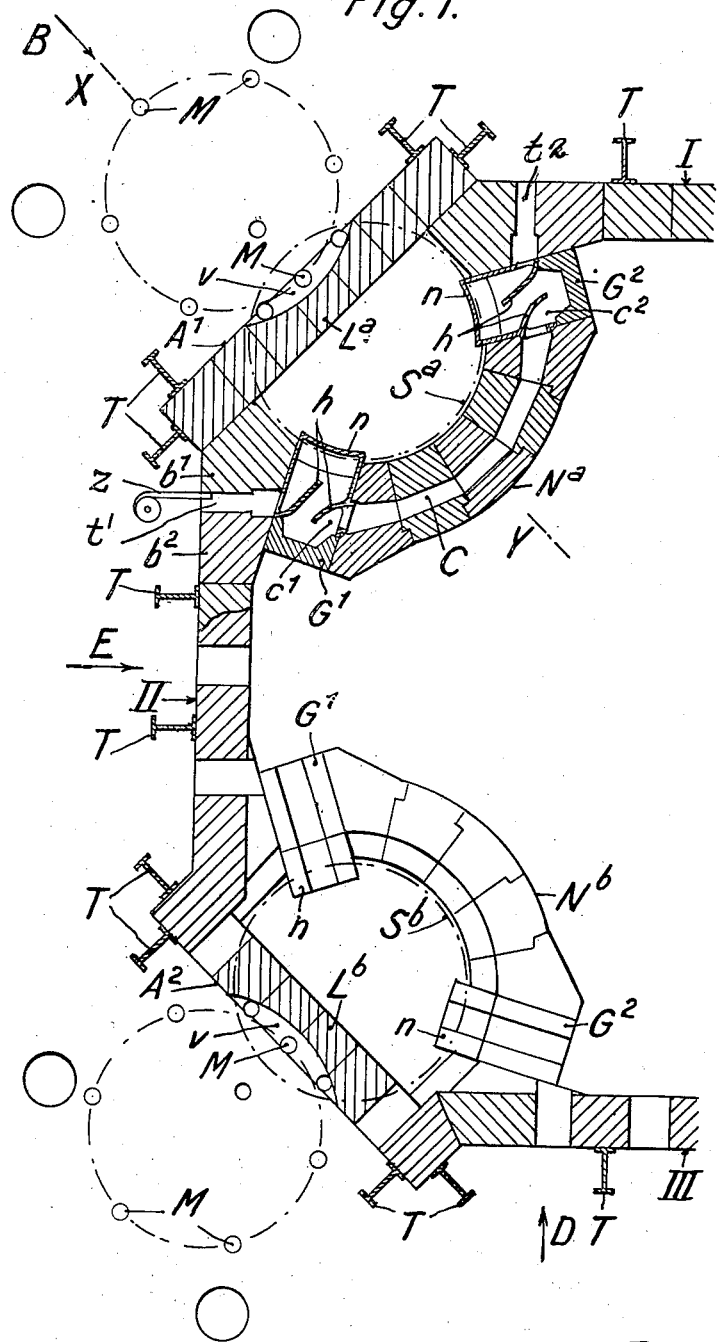
Fig. 1 is a horizontal sectional view of the furnace taken partly on the lines T—T, Figs. 2 and 5, and partly on the line V—V, Fig. 2.

A first principle of construction, which is a characteristic feature of this furnace, resides in a so-called "angle" installation for the gathering chambers formed in the usual niches. These niches $N^a$, $N^b$, etc., are formed at the angles of a polygonal figure, the sides I, II, III . . . of which constitute the front walls of the furnace. All this brickwork, made of refractory bricks, or other similar elements, is reinforced by I-irons T. The niches $N^a$, $N^b$, etc. . . . —and particularly the bond, forming a lintel, $L^a$—$L^b$, overhanging the opening of these niches—thus constitute independent structures the strength of which is not compromised by the eventual removal of certain bricks from the front walls I, II, III . . . , thus permitting, in certain conditions, which will be explained later on, removal of a worn trough and replacement of it by a new one.

Rotating basins $S^a$—$S^b$ are diagrammatically illustrated in the accompanying drawings. The depth of the niches is such that the rotating basins, once placed in position, are nearly completely fitted therein, being level with the front of the angle $A^1$ or $A^2$ of the furnace. The outer facing of this front has, in proximity to the basin and vertically to the latter, a circular shape for uncovering the gathering sector $v$ of the moulds M.

The protection of these niches against deterioration is ensured by a circulation of a cooling fluid, air for instance, within their brickwork. For that purpose, certain of the bricks constituting this brickwork are hollow so as to form a continuous channel C, free from any inner obstacle, in such a manner that the cooling air blown into this channel, by means of a blower the nozzle Z of which is inserted in a hole $t^1$, permanently ensures intense cooling of the back wall of the niche, in contact with the molten glass in the furnace, and issues to the exterior through a hole $t^2$.

This cooling fluid passes through the troughs $G^1$, $G^2$, which are also hollow. For that purpose, these troughs, the body of which is made of refractory material, are so shaped as to present an inner chamber $c^1$, $c^2$ communicating with the conduit C and with the holes $t^1$, $t^2$. This chamber can, according to the forms of construction, be either constituted by a complete or partial metal armature or box, or constituted by a cavity of the refractory body resting on the lower course of the niche brickwork (Fig. 6). Preferably, inner staggered walls $h$ compel the cooling fluid to sweep over the walls of said chambers, this ensuring active cooling of the troughs.

Concerning the troughs themselves, the main inconveniences which, as previously set forth, result from the wear of the latter, in particular of their nose portion, situated above the basin, unavoidably necessitate in actual installations the replacement of the trough.

In that respect, a first characteristic improvement of the invention which, in conjunction with the cooling, increases the life of the trough, consists in forming the latter in two parts, one of which constitutes a removable nose portion $n$ (Fig. 6) which can be separated from the trough body and removed through the upper opening of the niche itself, after removal of the rotating basin, without it being necessary to empty the furnace.

This replacement of the nose portion of the trough appreciably increases the life of the latter, insufficiently however for reaching the term of a normal operation of the furnace. In known installations, it would then be necessary to change the trough and, for that purpose, to stop, and even to empty the furnace, considering the inaccessibility of the trough for the reasons previously indicated.

On the contrary, in the present case and owing to the structure of the furnace and to the "angle" arrangement of the niches, the replacement of the trough can be effected by removing a row of bricks and by removing certain bricks from the sub-jacent row, in the example shown in the figures, the bricks $b^1$, $b^2$ if the trough $G^1$ is to be removed. For that purpose, the bricks $b^3$, $b^4$ must not take any bearing on the bricks $b^1$, $b^2$, and the latter must not be locked by any iron member T.

Another advantage afforded by the invention avoids moreover the necessity of stopping or prematurely emptying the furnace for the replacement of a trough. It consists in associating, with each gathering chamber, consequently in each niche, not a single trough, but two, $G^1$, $G^2$, which are placed in position as the gathering station is being constructed. When the first trough $G^1$, after replacement of its removable nose portion, has been worn to such an extent that it is useless, it is cut off by any suitable means, and the trough $G^2$ is put in service, by uncovering its channel, which has been previously cut off.

Owing to these associated arrangements, the gathering station can be satisfactorily maintained in condition of operation until the upper brickwork of the furnace is replaced. At this moment, advantage is taken of the usual compulsory operation for removing the two worn troughs and replacing them by two new troughs with cooling chambers and removable nose portions, so that the furnace is ready for further operation.

In this particular system of gathering stations fitted into niches of the wall of the furnace, the special structure of the latter, of the niches and troughs, the duplication of these latter at one and the same station, finally allow of obtaining that the normal practice of regeneration of the furnace is not subjected to any interference due to the gathering stations, this constituting an extremely important and advantageous technical and economical result.

In the figures of the accompanying drawings, certain of the openings or holes, not designated by reference numbers, serve, either for the cooling of the framework of the basin, or for the ventilation of the moulds of the machine operating with the gathering station, or for the manipulation of the obturators.

What I claim as my invention and desire to secure by Letters Patent is:

1. Glass furnace, comprising: a polygonal enclosure, niches provided in the wall of the furnace at the angles of the latter and each capable of receiving a gathering vessel, a continuous channel provided in the wall of the back of each niche, and means for causing a cooling fluid to circulate in this channel.

2. Glass furnace, comprising: a polygonal enclosure, niches provided in the wall of the furnace at the angles of the latter, gathering vessels fitted in these niches, troughs supplying to said gathering vessels the molten glass contained in the furnace, and cooling means for these troughs.

3. Glass furnace, comprising: a polygonal enclosure, niches provided in the wall of the furnace at the angles of this enclosure, a continuous channel provided in the wall of the back of each niche, a gathering vessel fitted in each of these niches, troughs for supplying to said vessels the molten glass contained in the furnace, chambers beneath said troughs, a communication between said chambers and said channel, and means ensuring the continuous circulation of the cooling fluid in the circuit thus formed.

4. A glass furnace of the type described comprising troughs for discharging glass, cavities under the lower faces of said troughs, fittings on which the said troughs rest and which form with the said cavities inner cooling chambers, and means for causing a cooling fluid to circulate in the said chambers.

5. A glass furnace of the type described comprising troughs for discharging glass, cavities under the lower faces of said troughs, fittings on which said troughs rest and which form with the said cavities inner cooling chambers, staggered partitions in the said chambers and means for causing a cooling fluid to circulate in said chambers.

EMILE ROIRANT.